June 18, 1963  E. P. WATKINS  3,094,683
SEMAPHORE ARM VEHICLE SIGNAL
Filed March 14, 1960  2 Sheets-Sheet 1

INVENTOR.
EDWIN P. WATKINS
BY GLEIM & CANDOR

ATTORNEYS

June 18, 1963 — E. P. WATKINS — 3,094,683
SEMAPHORE ARM VEHICLE SIGNAL
Filed March 14, 1960 — 2 Sheets-Sheet 2
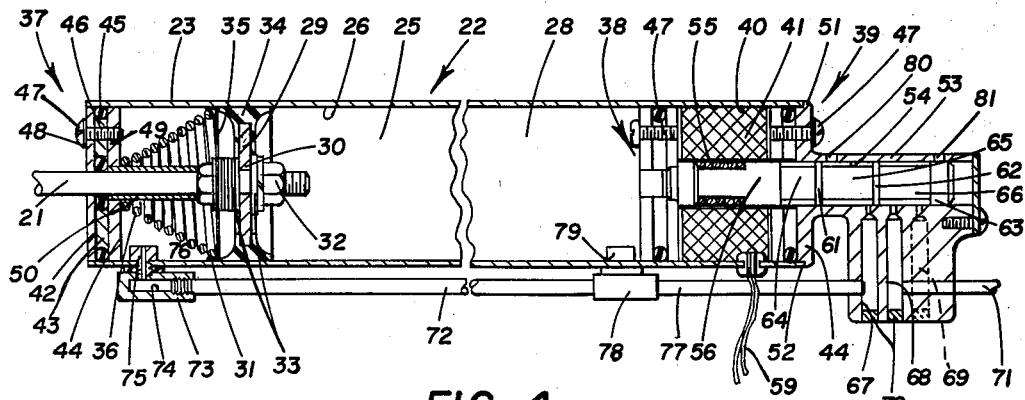
FIG. 4
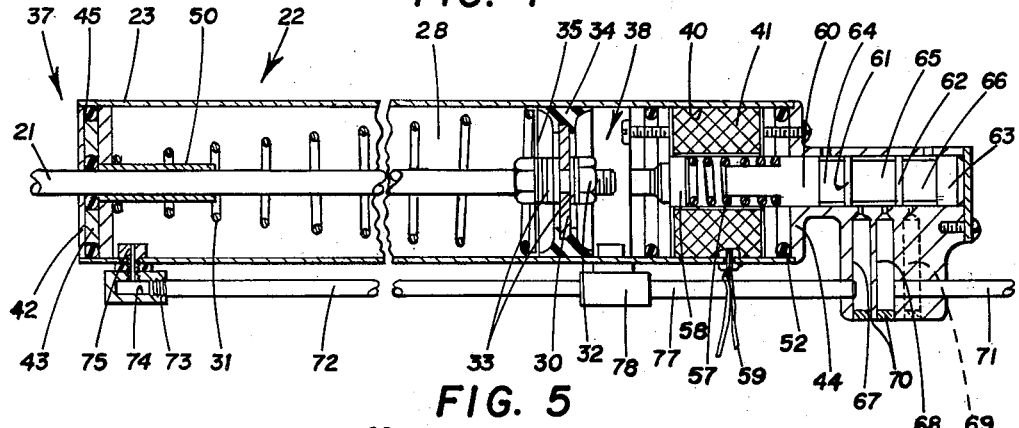
FIG. 5
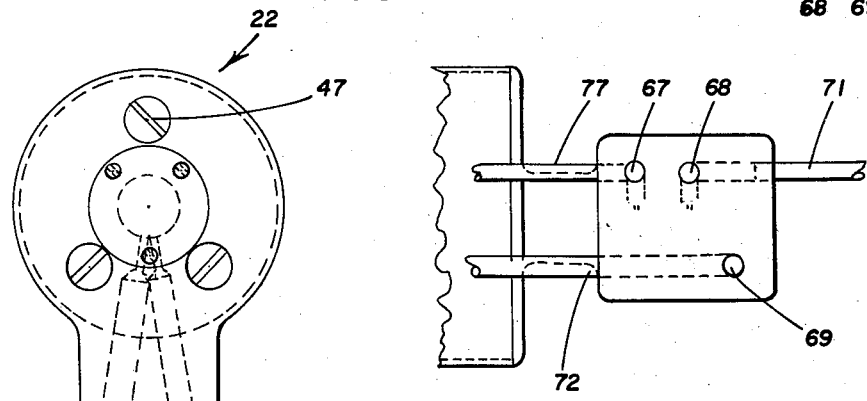
FIG. 6
FIG. 7
INVENTOR.
EDWIN P. WATKINS
BY GLEIM & CANDOR
ATTORNEYS

United States Patent Office 3,094,683
Patented June 18, 1963

3,094,683
SEMAPHORE ARM VEHICLE SIGNAL
Edwin P. Watkins, Springfield, Ohio, assignor to Ringwald Products, Inc., Springfield, Ohio, a corporation of Ohio
Filed Mar. 14, 1960, Ser. No. 14,576
12 Claims. (Cl. 340—136)

This invention relates to an improved signal means for vehicles and the like and, in particular, to improved means for operating such a signal means or the like.

Many movable signal devices, such as warning and directional signals and the like, have been designed for vehicles to be selectively or automatically operated to a plurality of positions to visibly convey such information to other motorists or pedestrians. For example, school busses normally carry warning stop signs that automatically swing into signalling position when such buses stop on the highway to warn traffic to stop as the buses may be discharging or receiving passengers.

Accordingly, it is an object of this invention to provide an improved signalling means.

Another object of this invention is to provide an improved means for operating signal means or the like.

Another object is to provide an improved gas or fluid operated cylinder and piston arrangement.

A further object of this invention is to provide an improved means for compartmentalizing or closing such a cylinder or the like.

Other objects, uses and advantages of this invention will become apparent upon a reading of the following specification taken in conjunction with the accompanying drawings forming a part thereof and wherein:

FIGURE 4 is an enlarged, axial, cross-sectional view of the improved signal control means of this invention, illustrating the control means in one of its operating positions;

FIGURE 5 is a view similar to FIGURE 4 and illustrates the control means in another of its operating positions;

FIGURE 6 is an end view of the control means illustrated in FIGURES 4 and 5; and, FIGURE 7 is a bottom view of a portion of the control means illustrated in FIGURES 4 and 5.

Figure 1:
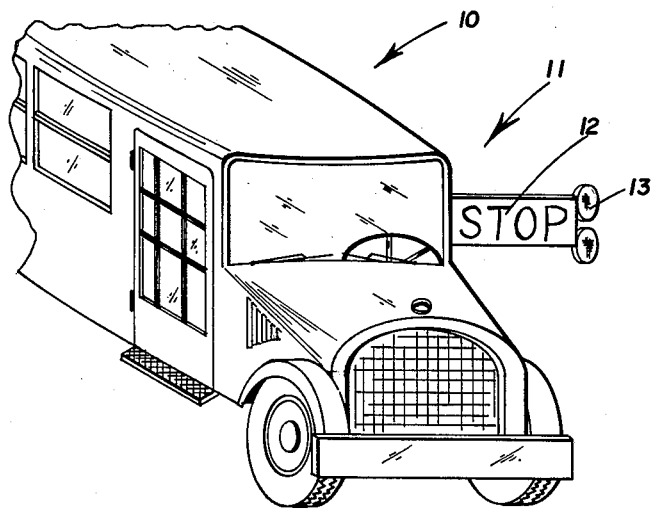
FIGURE 1 is a fragmentary, perspective view of a vehicle incorporating the signal means of this invention.

As illustrated in FIGURE 1, a vehicle 10, such as a school bus or other vehicle, has the signal means 11 of this invention attached thereto and operated in a manner hereinafter described.

In the embodiment illustrated in the drawings, signal means 11 comprises a stop sign 12 pivotally secured, as for example, to a side of the vehicle 10 and adapted to be pivoted from a position against the side of the vehicle 10 into a position perpendicular thereto to warn other motorists. If desired, stop sign 12 may include warning lights 13 attached thereto.

Figure 2:
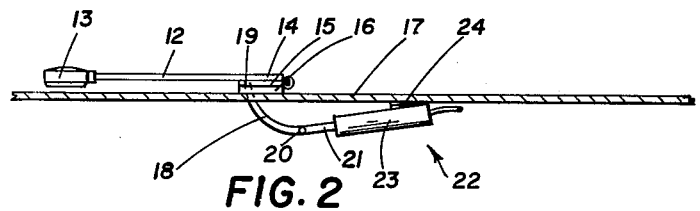
FIGURE 2 is an axial, cross-sectional view of a portion of the vehicle illustrated in FIGURE 1 and illustrates the signal means in one of its operating positions.
Figure 3:
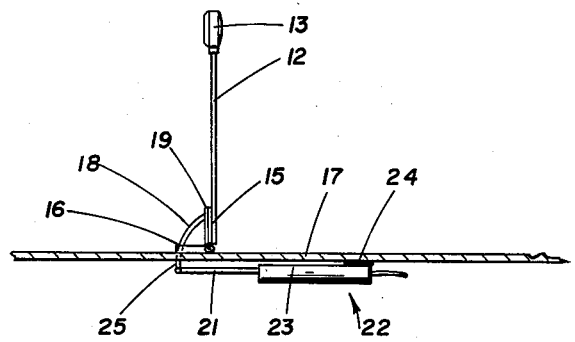
FIGURE 3 is a view similar to FIGURE 2 and illustrates the signal means in another of its operating positions.

As illustrated in FIGURES 2 and 3, stop sign or signal means 12 has an end portion 14 secured to a plate 15 which is, in turn, hingedly secured to a plate 16 that is detachably fastened to the outer surface of frame means 17 of vehicle 10. An arcuate arm 18 passes through suitable openings formed in frame means 17 and plate 16 and is secured at one end 19 thereof to plate 14. The other end 20 of arm 18 is pivotally secured to a piston rod 21 of the gas or fluid operated control means 22 of this invention, the fluid operated control means 22 including a cylinder 23 pivotally secured to the inside surface of frame means 17 by suitable hinge means 24.

When piston rod 21 is in its retracted position within cylinder 23 of control means 22, the rod 21 through the interconnecting arm 18 causes stop sign or signal means 12 to be pivoted against the side of vehicle 10 in the manner illustrated in FIGURE 2. When piston rod 21 is extended in the manner illustrated in FIGURE 3, the interconnecting arm 18 causes signal means 12 to be pivoted to the side of vehicle 10 into its signalling position.

The cylinder 23 of fluid operated control means 22, as illustrated in FIGURES 4–7, has an elongated chamber 25 formed therein, defining an internal peripheral surface 26 of cylinder 23. Chamber 25 is divided into two compartments 27 and 28 and is provided with piston 29 interconnected to piston rod 21.

The piston 29 includes a disc-like member 30 telescopically disposed on rod 21 and is secured in a desired axial position by nuts 31 and 32 threadably disposed on rod 21 and compacting washers 33 against the disc-like member 30. An annular flexible member 34 is carried on the outer periphery of disc-like member 30 and is disposed in sealing and sliding engagement with internal peripheral surface 26 of cylinder 23.

As illustrated, a retainer 35 is carried on piston rod 21 adjacent the piston 29 thereof and is adapted to have one end of compression spring 36 disposed in engagement therewith and the other end thereof disposed against an end of cylinder 23 to tend to urge piston 29 to the position illustrated in FIGURE 5 whereby piston rod 21 is disposed in its retracted position. However, as will be evident hereinafter, compression spring 36 may be eliminated, if desired.

A plurality of closure means 37, 38 and 39 are disposed within the cylinder 23, the closure means 37 and 38 closing off the respective ends of compartments 27 and 28 and closure means 38 and 39 being suitably spaced to provide a compartment 40 for receiving a solenoid coil 41 which functions in a manner hereinafter described.

Each of the closure means 37 and 38 and 39 are so constructed in substantially the same manner except for minor differences thereof which are apparent from the drawings and will be explained hereinafter. Each of the closure means 37, 38 and 39 respectively includes a plurality of disc-like elements 42, 43 and 44 arranged in side by side relation with the intermediate disc-like element 43 having its outer periphery spaced radially inwardly from the outer peripheries of disc-like members 42 and 44 whereby an annular channel 45 is formed between the facing sides of the disc-like members 42 and 44. An annular resilient member 46, such as an O-ring or the like, is disposed in channel 45 of each of closure means 37, 38 and 39 and is adapted to be deformed radially outwardly into sealing and frictional engagement with the internal peripheral surface 36 of cylinder 23 when screws 47 are tightened to substantially compact the disc-like members 42, 43 and 44 together.

Each of screws 47 has an enlarged head 48 abutting the outer surface of respective member 42 and a threaded portion 49 passing through aligned apertures in the respective members 42 and 43 and disposed in threading engagement with another aligned aperture formed in the respective disc-like element 44. Thus, by merely rotating screws 47 into a particular direction, the respective disc-like elements 42, 43 and 44 are compacted together to cause the resilient member 46 to be squeezed between the facing sides of disc-like elements 42 and 44 and be deformed radially outwardly into its sealing and frictional engagement with the internal peripheral surface 26 of cylinder 23.

It can, therefore, be seen that closure means 37, 38 and 39 can be adjusted laterally and radially within cylinder 23 to any desired position and be locked and sealed in place by merely rotating screws 47.

The disc-like member 44 of closure means 37 includes an elongated bushing 50 which telescopically receives piston rod 21 and limits axial movement of piston 29 to the left in the manner illustrated in FIGURE 4.

Disc-like element 44 of closure means 39 includes an annular rim or shoulder 51 which is adapted to abut an end 52 of cylinder 23 to position closure means 39 at the end 52 of cylinder 23.

Disc-like element 44 of closure means 39 also includes an enlargement 53 extending therefrom, the enlargement 53 including a bore 54 coaxially aligned with a central cylindrical opening 55 formed in solenoid coil 41 whereby an axially movable valve member 56 is disposed in aligned bores 54 and 55 in the manner illustrated in FIGURES 4 and 5.

The movable valve member 56 is normally urged to a position illustrated in FIGURE 5 by a compression spring 57 disposed between the left end of valve member 56 and a retainer 58 carried by closure means 38. Valve member 56 is moved to the position illustrated in FIGURE 4 when solenoid coil 41 is energized by electrical current being applied thereto through a suitable lead or leads 59.

Valve member 56 includes a plurality of spaced lands 60, 61, 62 and 63 interconnected by respective smaller annular portions 64, 65 and 66.

The enlargement 53 is formed with angularly disposed bores 67, 68 and 69 which transversely intersect bore 54 substantially radially thereof. Suitable plugs 70 close off lower ends of bores 67, 68 and 69.

The intermediate bore 68 is interconnected with a suitable vacuum source, such as a manifold of the internal combustion engine of vehicle 10 or the like, by a conduit 71.

Bore 69 is interconnected to compartment 27 of cylinder 23 by conduit 72, the conduit 72 terminating in a retainer 73 having an interconnecting bore 74 interconnected with a bore 75 of a threaded member 76 detachably securing the retainer 73 to cylinder 23.

Similarly, bore 67 is interconnected to compartment 28 of cylinder 23 by conduit 77 and retainer 78 that is detachably secured to cylinder 23 by a conduit member 79.

A pair of transverse bores 80 and 81 are formed in the enlargement 53 and respectively intersect the bore 54 and interconnect the same with the atmosphere for a purpose hereinafter described.

The operation of pneumatic means 22 will now be described. And as previously stated, when solenoid 41 is de-energized, the spring 57 moves valve member 56 to the right to the position illustrated in FIGURE 5 whereby vacuum source is interconnected through bore 68 to bore 67 by lands 61 and 62 of valve member 56. Thus, the vacuum source is interconnected with compartment 28 of cylinder 23 and causes piston 29 to move to the position illustrated in FIGURE 5 whereby signal means 12 is pivoted to its non-signalling position near the side of the vehicle 10 in the position illustrated in FIGURE 2. Simultaneously, the compartment 27 is interconnected to the atmosphere as bore 69, interconnected therewith, is interconnected to bore 81 by lands 62 and 63 of valve member 56. Thus, as long as the coil 41 is de-energized, the valve member 56 maintains vacuum source interconnected with compartment 28 whereby signal means 12 is vacuum locked in its non-signalling position and will not swing outwardly relative to vehicle 10 through vibrations, shock or the like.

When it is desired to utilize signal means 12, the coil 41 is energized and moves valve member 56 to the left to the position illustrated in FIGURE 4 whereby the vacuum source is interconnected, by the bore 68, to the bore 69 through valve lands 62 and 63 to cause piston 29 to move to the position illustrated in FIGURE 4 against stop means 50 whereby the signal or sign 12 is vacuum locked in its signalling position as illustrated in FIGURE 3. Simultaneously, the atmosphere is interconnected to compartment 28 of cylinder 23 as the bore 67 is interconnected to the bore 80 by the valve lands 61 and 62.

Therefore, it can be seen that, regardless of the operating position of signal means 12, the same is vacuum locked in either of its operating positions, thus providing an accurate and safe signalling structure.

If desired, the solenoid coil 41 may be operatively interconnected to any suitable portion or part of the vehicle 10, whereby the signalling means 12 will be actuated to its signalling position to warn other motorists.

While the foregoing presents preferred embodiments of the present invention, it is obvious that other modifications and/or equivalents of the present invention may be employed without departing from the scope of this invention, which is defined in the appended claims.

What is claimed is:

1. In combination, a vertically disposed wall having inner and outer surfaces, a cylinder having an elongated chamber, a movable piston disposed in said chamber and dividing said chamber into two compartments, a rod carried by said piston, a signal means including a horizontally swingable arm pivotally attached at one end to the outer surface of said wall, an arcuate push bar having an arcuate extent of the order of ninety degrees rigidly fixed at one end to said arm adjacent the pivotally attached end of the latter and extending substantially horizontally through an aperture in said wall, said push bar being pivotally connected at its other end to the free end of said rod, said signal means being movable between two operating positions, a vacuum source, and means for selectively interconnecting said source with one of said compartments to cause said piston to move said rod to its extended position while simultaneously interconnecting the other compartment with the atmosphere and for selectively interconnecting said source with said other compartment to cause said piston to move said rod to its retracted position while simultaneously interconnecting said one compartment to the atmosphere whereby said signalling means is vacuum locked in either of its operating positions one position being substantially horizontal and perpendicular to the outer surface of said wall and the other position being substantially flat against said surface.

2. A combination as set forth in claim 1 wherein said last-named means includes an axially movable valve carried by and within one end of said cylinder.

3. A combination as set forth in claim 1 wherein said last-named means includes a solenoid coil, said coil and valve being mounted coaxially within one end of said cylinder and an axially movable valve controlled by said coil.

4. A combination as set forth in claim 1 wherein said selectively interconnecting means is electrical.

5. In combination, frame means, signal means pivotally mounted to said frame means and movable between two operating positions, a cylinder of para-magnetic material having an elongated chamber, a movable piston disposed in said chamber and dividing said chamber into two compartments, a rod carried by said piston and being operatively interconnected to said signal means, a vacuum source, a solenoid coil disposed in said chamber and utilizing part of said cylinder as part of the flux path thereof, an axially movable valve member carried by said cylinder, said valve member normally being urged to one of its operating positions by spring means to interconnect said source with one of said compartments to cause said piston to move said rod to its retracted position and thus move said signal means to one of its operating positions while simultaneously interconnecting the other compartment to the atmosphere, said valve member being moved to another of its operating positions when said coil is energized to interconnect said source with said other compartment to cause said piston to move said rod to its extended position and thus move said signal means to the other operating position thereof while simultaneously interconnecting said one compartment to the atmosphere whereby said signal means is vacuum locked in either of its operating positions.

6. A combination as set forth in claim 5 wherein said signal means is disposed parallel against said frame means when said rod is in its retracted position and signal means is disposed perpendicular to said frame means when said rod is in its extended position.

7. A combination as set forth in claim 5 wherein said cylinder has an internal peripheral surface and means sealing against said internal peripheral surface to close said chamber thereof, said means comprising a plurality of disc-like elements arranged in side by side relation and each having an outer periphery, an intermediate disc-like element having its outer periphery spaced inwardly from said outer peripheries of adjacent elements to provide an annular channel between the facing sides of said adjacent elements, a continuous resilient means disposed in said channel, and means drawing said disc-like elements together to deform said resilient means outwardly into frictional and sealing engagement with said internal peripheral surface of said cylinder.

8. In combination, a cylinder of para-magnetic material having an elongated chamber, a movable piston disposed in said chamber and dividing said chamber into two compartments, a solenoid coil disposed in said chamber and utilizing part of said cylinder for part of the flux path thereof, and an axially movable valve member carried by and within said cylinder and magnetically coupled to said coil, said valve member being adapted to selectively interconnect a vacuum source with either of said compartments to move said piston in a desired direction.

9. In combination, a cylinder of para-magnetic material having an elongated chamber, a movable piston disposed in said chamber and dividing said chamber into two compartments, a rod connected to said piston, a solenoid coil disposed in said chamber and utilizing part of said cylinder for part of the flux path thereof, an axially movable valve member carried by said cylinder, and spring means normally urging said valve member to one position relative to said cylinder, said coil when energized moving said valve member to another of its operating positions in opposition to said spring means, said valve member when in said one position being adapted to interconnect a vacuum source with one of said compartments to move said rod and piston to their retracted position while simultaneously interconnecting the other compartment with the atmosphere and when in said other position being adapted to interconnect the vacuum source with said other compartment to move said rod and piston to their extended position while simultaneously interconnecting said one compartment with the atmosphere.

10. In combination, a member having a cylindrical bore defining an internal cylindrical surface, and means defining a transversely extending peripherally expandable self-anchoring and chamber sealing wall, said means comprising at least three disc-like elements arranged in side by side relation and each having an outer periphery, said disc-like elements being disposed in said bore, an intermediate disc-like element having its outer periphery spaced inwardly from said outer peripheries of adjacent disc-like elements to provide an annular channel between the facing sides of said adjacent elements, a continuous resilient means disposed in said channel, and means drawing said adjacent elements and said intermediate element together to deform said resilient means outwardly into frictional and sealing engagement with said internal peripheral surface of said member.

11. A wafer shaped peripherally expandable self-anchoring wall assembly for cylindrical chambers, comprising: a plurality of disc-like elements arranged in side by side relation and each having an outer periphery, an intermediate element of said disc-like elements having its outer periphery spaced inwardly from the outer peripheries of adjacent elements to provide an annular channel between the facing sides of said adjacent elements, a continuous resilient means disposed in said channel, and means carried by said elements to draw said elements together to deform said resilient means radially outwardly beyond the outer peripheries of said adjacent elements.

12. A combination as set forth in claim 11 wherein said last-named means comprises a plurality of bolts having enlarged heads and threaded ends, said bolts each passing through aligned openings in one of said adjacent elements and said intermediate element and being disposed in threaded relation with the other of said adjacent elements whereby said elements are drawn against said enlarged heads when said bolts are rotated in a particular direction.

References Cited in the file of this patent

UNITED STATES PATENTS

| | | |
|---|---|---|
| 1,411,148 | Aebi | Mar. 28, 1922 |
| 1,465,494 | Spung | Aug. 21, 1923 |
| 1,734,094 | MacKay | Nov. 5, 1929 |
| 1,768,538 | Bedford | July 1, 1930 |
| 1,827,289 | Haywood | Oct. 13, 1931 |
| 1,939,050 | Hall | Dec. 12, 1933 |
| 2,047,382 | Reed | July 14, 1936 |
| 2,099,331 | Crenshaw | Nov. 16, 1937 |
| 2,920,309 | Fultz | Jan. 5, 1960 |

FOREIGN PATENTS

| | | |
|---|---|---|
| 368,178 | France | Sept. 26, 1906 |